United States Patent Office 3,078,161
Patented Feb. 19, 1963

3,078,161
BATTERY GRID ALLOY
Harold E. Zahn, Buffalo, N.Y., assignor to Gould National Batteries, Inc., St. Paul, Minn.
No Drawing. Filed Apr. 3, 1958, Ser. No. 726,030
1 Claim. (Cl. 75—166)

This invention relates generally to lead-acid storage batteries, and more particularly to improved alloy formulations from which battery grid constructions are cast. This application is a continuation-in-part of my application Serial No. 553,426, filed December 16, 1955, now Patent No. 2,841,491.

It has been known for some time in the art that the maximum effective use and operative life of a storage battery is a function of the rate of deterioration of the positive grid metal. In the industry grid metal alloys containing 6% to 12% antimony in lead are commonly used.

It has heretofore been considered desirable to include rather high antimony contents in grid alloys, with a view to providing the finished grid structures with adequate strength and to facilitate the grid casting processes and handling of the grids after removal from the molds. However, it is now known that high antimony contents in grid alloys of the prior art will provide grids having relatively high rates of corrosion. Also, it is now known that as corrosion progresses, the dissolved antimony migrates from the positive plate to the negative plate, whereupon it deposits upon the negative plate causing spontaneous discharge of the plate by local cell action between the antimony and the sponge lead of the plate. This self-discharge action takes place during periods when the battery stands idle, and thus the available battery capacity seriously decreases during periods of non-use.

Another disadvantage attendant upon antimony contamination of the negative plate results from creation of a sulfated negative condition, as a result of the capacity-robbing self-discharge action referred to hereinabove. This condition is characterized by formation of hard granular material in the negative plate, which resists recharge to a healthy condition capable of delivering its original capacity.

The present invention contemplates improved alloy formulations characterized by the use of silver and cobalt in specific ranges, to effectively reduce the rate of grid metal corrosive attack without introduction of new deleterious effects. Whereas, it is now well known that the presence of cobalt in such alloys usually tends to improve the corrosion resistance of the alloy, it also tends to destroy battery separators of cellulosic content. I have discovered, however, that small amounts of cobalt and silver in the alloy in accord with the specific formulations of the present invention, results in initial formation of a compact adherent corrosion-resistant masking film which effectively shields the underlying grid metal from corrosive action of the battery acid electrolyte, while at the same time avoiding adverse effects upon the cellulose contents of the battery separators. By reducing the rate of grid metal corrosion, the useful life of the grid is extended so that it continues for longer periods to effectively conduct electrical current and to provide adequate mechanical support for the contained active material. Hence, greatly extended useful battery performance is attained. By reducing the rate of grid metal corrosion, not only is the useful life of the grid extended, but less antimony, if antimony is present in the alloy formulation, is transferred over to the negative plate per unit time, so that self-discharge and negative plate sulfation rates are reduced compared to performances of conventional alloy batteries.

The presence of silver in certain proportions in a cobalt containing formulation will neutralize the normally destructive effect of cobalt upon cellulosic materials present in the battery. However, it is desirable to locate the cobalt and silver contents at the situs of the corrosion action and in intimate relative proximity to obtain maximum effectiveness and economy. Since it is the grid metal per se that must be protected against disintegration, maximum effectiveness of the protective agents will be dependent upon the proximity of those agents to the structure they are to protect. I have discovered that cobalt and silver can be incorporated in certain effective and economical amounts in certain grid alloy formulations, so that as the grid surface undergoes electrochemical oxidation, the cobalt-silver components of the grid alloy effectively alter the oxidation by-product to a protective form of film which masks the grid metal against corrosion.

Production of effective economical lead base alloy compositions containing small quantities of cobalt has heretofore presented a problem in maintaining uniformity of the cobalt content in the alloy melt and in the finished casting. Whereas, cobalt is considered completely insoluble in lead in the liquid or solid state, it has been found that by alloying cobalt with tin and/or antimony, compounds are formed which may be effectively dispersed as small particles in a lead melt and maintained in a substantially uniform dispersion by mild agitation of the molten alloy. Unless the alloy is frequently or continuously agitated, however, the cobalt component will segregate so as to result in non-homogeneous castings with little or no effective cobalt dispersion.

I have found that the effectiveness of cobalt in reducing grid corrosion as explained hereinabove, can be obtained with several alloys, each of which has particular advantages. I have found that where it is preferred to avoid use of antimony for reasons referred to hereinabove, a grid casting alloy free of antimony may be made by employing tin as a carrier of cobalt instead of antimony. For example, I have found that a suitable grid metal alloy in accordance with the present invention may be compounded to contain substantially no antimony and from .50% to 4.0% tin; .025% to .25% silver; .001% to .10% cobalt; the balance being substantially lead. More specifically, a suitable alloy has been formulated to comprise substantially no antimony and from .025% to .25% silver; from .10% to .001% cobalt; the balance being substantially lead. An alloy dispersion of cobalt in tin may be prepared by melting tin at temperatures in excess of 1000° F. and mixing therein finely divided cobalt metal. Small amounts of lead may then be added to produce a master cobalt dispersion. The master alloy may then be added to additional antimony-free lead or with antimonial lead, as may be required to produce the desired casting composition. After the working alloy is prepared, and whenever it is in molten condition the cobalt content may be kept in uniform suspension therein by stirring or the like.

I claim:
A grid metal alloy containing substantially no antimony and consisting essentially of from .50% to 4.0% tin; .025% to .25% silver; .001% to .10% cobalt; the balance being substantially lead.

References Cited in the file of this patent
UNITED STATES PATENTS
2,320,773   Fink et al. _____ June 1, 1943